United States Patent
Tozzi et al.

(10) Patent No.: US 12,480,462 B1
(45) Date of Patent: Nov. 25, 2025

(54) TURBULENCE INDUCER FOR INTERNAL COMBUSTION ENGINES

(71) Applicant: Prometheus Applied Technologies, LLC, Fort Collins, CO (US)

(72) Inventors: Luigi P Tozzi, Fort Collins, CO (US); Maria-Emmanuela Sotiropoulou, Fort Collins, CO (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 0 days.

(21) Appl. No.: 18/939,867

(22) Filed: Nov. 7, 2024

Related U.S. Application Data

(60) Provisional application No. 63/712,680, filed on Oct. 28, 2024.

(51) Int. Cl.
*F02M 21/02* (2006.01)
*F02M 35/10* (2006.01)

(52) U.S. Cl.
CPC .... *F02M 21/0218* (2013.01); *F02M 21/0248* (2013.01); *F02M 35/10262* (2013.01)

(58) Field of Classification Search
CPC ........... F02M 21/0218; F02M 21/0248; F02M 33/00; F02M 35/10262
See application file for complete search history.

(56) References Cited

U.S. PATENT DOCUMENTS

| | | | | |
|---|---|---|---|---|
| 1,514,132 | A * | 11/1924 | Cortelyou | F02M 1/00 138/37 |
| 4,359,997 | A | 11/1982 | Lyssy | |
| 6,158,412 | A * | 12/2000 | Kim | F02M 35/10262 60/299 |

(Continued)

FOREIGN PATENT DOCUMENTS

CN 117052558 A 11/2023

OTHER PUBLICATIONS

Sotiropoulou, E., et al: Enabling Diesel-Like Performance in Heavy Duty H2-ICE via a Sophisticated Combustion System Solution, ATZ live Heavy Duty Engines 2024—MTZ Conference, Germany, 2024.

(Continued)

*Primary Examiner* — Syed O Hasan
(74) *Attorney, Agent, or Firm* — Barcel;o, Harrison & Walker LLP

(57) ABSTRACT

In certain embodiments, devices such as Turbulence Inducers may be installed within the intake runner in the proximity of the intake ports of an internal combustion engine. Such Turbulence Inducer devices may efficiently convert the laminar flow kinetic energy upstream of the intake runner into turbulent flow kinetic energy and consequently may increase the mixing of fuels like Hydrogen and Methanol that are injected via an intake port or in-cylinder during the intake stroke of an internal combustion engine. In certain embodiments, CFD simulations and engine test results of the Turbulence Inducer with engines fueled by one or more of Hydrogen and Methanol indicate remarkable extension of the knock and LOP limits enabling combustion improvements resulting in a power output increase of approximately 5-20%. Certain embodiments may realize homogeneous mixture preparation with both, liquid as well as gaseous fuels.

26 Claims, 10 Drawing Sheets

(56) References Cited

U.S. PATENT DOCUMENTS

| | | | |
|---|---|---|---|
| 11,499,489 B2* | 11/2022 | Kurtz | F02M 26/19 |
| 2003/0226539 A1 | 12/2003 | Kim | |
| 2006/0016426 A1 | 1/2006 | Yamamato | |
| 2009/0272356 A1 | 11/2009 | Abe | |
| 2011/0232604 A1* | 9/2011 | Russell | B01F 25/431 |
| | | | 123/434 |
| 2016/0195050 A1* | 7/2016 | Green | B01F 25/31331 |
| | | | 239/403 |
| 2019/0017426 A1* | 1/2019 | Zhang | B01F 23/10 |
| 2019/0360389 A1 | 11/2019 | Terunuma | |

OTHER PUBLICATIONS

Sotiropoulou, E., et al: Same-Cycle Spark Control: The Future of Hydrogen Engines. 13th Dessau Gas Engine Conference, Dessau, Germany, 2024.

Sotiropoulou, E., et al: Holistic Solution Enabling High Power Density & Efficiency H2-ICE, ATZ live Heavy Duty Engines 2023—MTZ Conference, Germany, 2023.

Sotiropoulou, E., et al: Prechamber Combustion: Enabling the Competitive Carbon-Neutral ICE. In CIMAC Congress, Paper No. 291, Busan, S. Korea, 2023.

Sotiropoulou, E., Tozzi, L., Trapp, C.: Breakthrough in Hydrogen Engine Combustion Enabling Zero Emissions and High Efficiency with Passive Prechamber Technology. In 12th Dessau Gas Engine Conference, Dessau, Germany 2022.

Yasueda, S., Sotiropoulou E., Tozzi, L.: Predicting Autoignition caused by Lubricating Oil in Gas Engines. In CIMAC Congress, Paper No. 37, Shanghai, China, 2013.

Sotiropoulou, et al: Zero Emission—The Evolution from Low Emission Natural Gas to Hydrogen Using a Pre-chamber Spark Plug.. MTZ Worldwide, vol. 2020-6, pp. 46-50, 2020.

International Search Report for OCT/US2024/054825 dated Jan. 15, 2025.

* cited by examiner

TURBULENCE INDUCER FOR INTERNAL COMBUSTION ENGINES

I. CROSS-REFERENCE TO RELATED APPLICATIONS

This application claims priority of U.S. Patent Application No. 63/712,680, entitled "Turbulence Inducer for Internal Combustion Engines," and filed Oct. 28, 2024. The entirety of the foregoing patent application is incorporated by reference herein to the extent consistent with the present disclosure.

II. FIELD OF THE INVENTION

The disclosure generally relates to systems and methods for using turbulence inducers in internal combustion engines, and more particularly to methods and systems for using turbulence inducers with engines fueled by one or more of Hydrogen and Methanol to extend knock and LOP limits and enable combustion improvements resulting in a power output increase.

III. BACKGROUND OF THE INVENTION

The following references describe problems with the state of the art that are more fully described below. These references are incorporated by reference herein to the extent consistent with this disclosure:

[1] Sotiropoulou, E., et al: Holistic Solution Enabling High Power Density & Efficiency H2-ICE, ATZ live Heavy Duty Engines 2023-MTZ Conference Nov. 9, 2023.
[2] Sotiropoulou, E., et al: Prechamber Combustion: Enabling the Competitive Carbon-Neutral ICE. In CIMAC Congress, Paper No. 291, Busan, S. Korea, 2023.
[3] Sotiropoulou, E., Tozzi, L., Trapp, C.: Breakthrough in Hydrogen Engine Combustion Enabling Zero Emissions and High Efficiency with Passive Prechamber Technology. In 12th Dessau Gas Engine Conference, Dessau, Germany 2022.
[4] Sotiropoulou, E., et al: Improving Efficiency of the Premixed Combustion by Reducing Cyclic Variability. In CIMAC Congress, Paper No. 257, Helsinki, Finland, 2016.
[5] Yasueda, S., Sotiropoulou E., Tozzi, L.: Predicting Autoignition caused by Lubricating Oil in Gas Engines. In CIMAC Congress, Paper No. 37, Shanghai, China, 2013.
[6] Sotiropoulou, E., Knepper, S., Deeken, S., Grewe, F.: Prechamber Spark Plugs: The Evolution from Low Emission Natural Gas to Zero Emission H2 Operation. MTZ Worldwide, vol. 2020-6, pp. 46-50, 2020.
[7] Tozzi, L.: Combustion System Design Study to Maximize Thermal Efficiency in Open Chamber Stationary Natural Gas Engines—CIMAC Congress Paper No. 176-2010, Bergen, Norway.

To achieve carbon neutral emissions from internal combustion engines, fuels having zero carbon like Hydrogen ($H_2$) and Ammonia ($NH_3$) and synthetic fuels like those formed by the combination of $H_2$ and $CO_2$ captured from the atmosphere like Methanol ($CH_3OH$), Natural Gas ($CH_4$), and others provide alternatives to fossil fuels. However, to meet the efficiency and power density requirements, all alternative fuels internal combustion engines, especially $H_2$ and $CH_3OH$ fueled engines, necessitate a high degree of air-fuel mixture-controlled homogeneity throughout the engine cylinder to prevent the occurrence of combustion anomalies like knock and lubrication oil preignition (LOP) at brake mean effective pressure (BMEP) levels typically higher than 12 bar as described in References [1]-[7] above.

Internal combustion engines may be characterized by laminar or very low turbulence type of flow in the intake ducts and ports. This type of flow is not conducive to the levels of convection or diffusivity needed to either breakup and vaporize droplets of liquid fuels like Methanol or to diffuse molecules of gaseous fuels like Hydrogen.

For these reasons apparatuses and methodologies must be considered to overcome the issue of poor mixing limiting the power density and efficiency in internal combustion engines operating with Methanol ($CH_3OH$), Hydrogen ($H_2$), Ammonia ($NH_3$), synthetic Natural Gas ($CH_4$), and other alternative fuels.

There is a need to address the foregoing deficiencies in the art.

IV. BRIEF DESCRIPTION OF THE DRAWINGS

V. DETAILED DESCRIPTION

Figure 1:
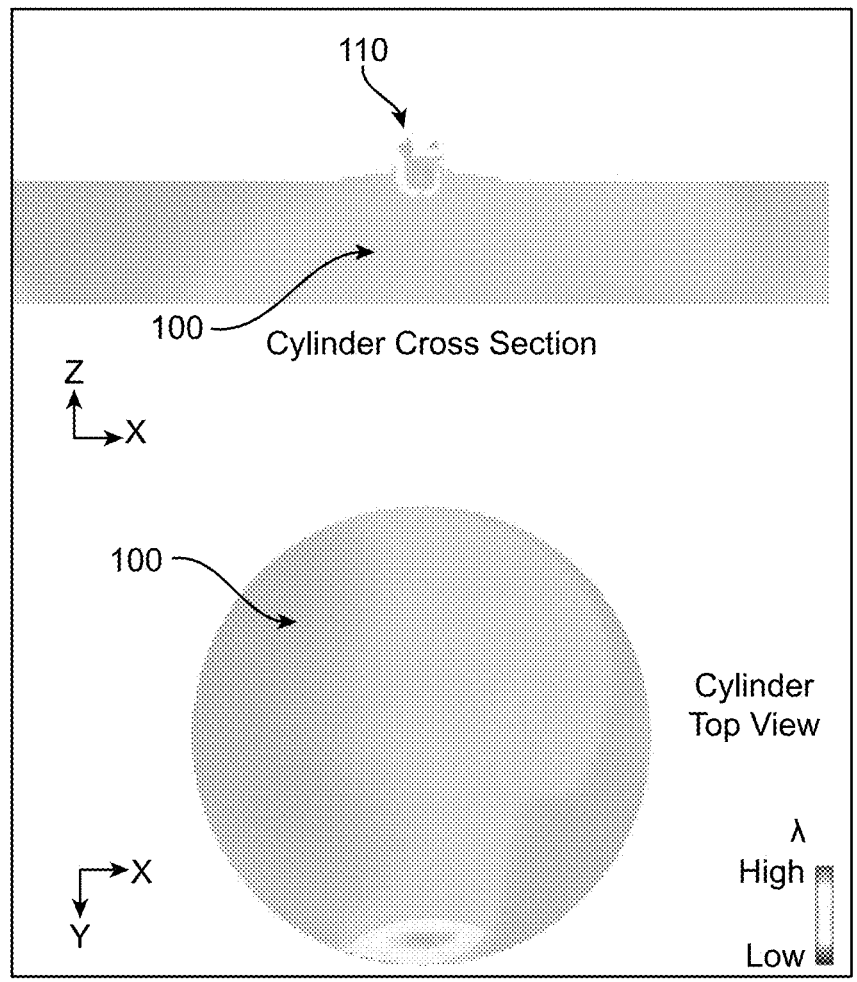
FIG. 1 depicts a cross-section view (top) and top view (bottom) of an in-cylinder homogeneous Lambda (2) distribution in accordance with certain embodiments.

In certain embodiments, validated CFD simulations and engine testing have demonstrated that by properly locating and orienting a novel design of a turbulence inducing device in the intake port of an internal combustion engine the in-cylinder mixture homogeneity can be improved for engines with fuels like Hydrogen, Methanol, and others known to one of skill in the art. Certain embodiments may realize homogeneous mixture preparation with both, liquid as well as gaseous fuels.

In certain embodiments, an internal combustion engine is disclosed, comprising: an engine intake port: an engine intake runner upstream of the engine intake port: at least one fuel injector upstream of the engine intake port: a turbulence inducer upstream of the fuel injector to convert laminar flow upstream of the turbulence inducer to turbulent flow downstream of the turbulence inducer. The turbulence inducer may be located a predeterminate distance ($\delta$) upstream of the intake port along a first longitudinal axis of the engine intake runner. The predeterminate distance (δ) may be between 20 mm and 50 mm. The predeterminate distance (δ) may be between 10 mm and 30 mm. The predeterminate distance (δ) may be a function of one or more of air velocity, fuel velocity, fuel type, engine intake runner geometry, and port geometry.

The turbulence inducer may be configured to convert the kinetic energy of the intake flow upstream of the turbulence inducer into turbulent flow to enhance the mixing of a fuel stream injected into the intake port via the fuel injector. The turbulence inducer may be configured to convert the kinetic energy of the intake flow upstream of the turbulence inducer into turbulent flow to enhance the mixing of a fuel stream injected into a combustion cylinder during the intake stroke of an internal combustion engine. The fuel stream may comprise one or more of Hydrogen and Methanol.

The turbulence inducer may comprise a second longitudinal axis that forms a predeterminate angle alfa (α) with the first longitudinal axis of the engine intake runner. The predeterminate angle alfa (α) is between 90° and 60°. The predeterminate angle alfa (α) is between 90° and 40°. The predeterminate angle alfa (α) may be a function of one or more of air velocity, fuel velocity, fuel type, engine intake runner geometry and port geometry.

The fuel injector may comprise a third longitudinal axis that forms a predeterminate angle beta (β) with the first longitudinal axis of the engine intake runner. The predeterminate angle beta (β) may be between 90° and 60°. The predeterminate angle beta (β) may be between 90° and 40°. The predeterminate angle beta (β) may be a function of one or more of air velocity, fuel velocity, fuel type, engine intake runner geometry and port geometry. The angle alfa (α), the angle beta (β) and the distance delta (δ) may be linked in a functional relationship to create turbulence characteristics necessary to optimize the mixing between fuel and combustion air for a specific engine application.

The turbulent flow may be characterized by one of small scale eddies, large scale eddies and medium scale eddies. The large scale eddies may have a length scale (LSE) in the range of approximately LSE=0.15-3.0 mm and a TKE in the range of approximately 20-100 m²/s². The large scale eddies may have an LSE and a TKE that depend on the intake flow velocity (V) as defined by the following approximate formulas: LSE=0.2/V: TKE=0.65V. The medium scale eddies may have a length scale (LSE) in the range of approximately LSE-0.1-3.0 mm and a TKE in the range of approximately 20-150 m²/s². The medium scale eddies may have an LSE and a TKE that depend on the intake flow velocity (V) as defined by the following approximate formulas: LSE=0.15/V: TKE=0.9V. The small scale eddies may have a length scale (LSE) in the range of approximately LSE-0.5-2.0 mm and a TKE in the range of approximately 20-200 m²/s². The small scale eddies may have an LSE and a TKE that depend on the intake flow velocity (V) as defined by the following approximate formulas: LSE=0.08/V: TKE=1.25V. The size of the eddies in the turbulent flow may be related to the physical state of the fuel as being liquid or gaseous and to the fuel molecular mass.

The turbulence inducer may comprise a perforated plate comprising a plurality of sharp edges for converting the laminar kinetic energy of the laminar flow into turbulent kinetic energy characterized by small scale eddies. The small scale eddies may enhance breakup and vaporization of liquid fuels. The turbulence inducer may comprise one or more helical surfaces for converting the laminar kinetic energy of the laminar flow into turbulent kinetic energy characterized by large scale eddies. The larger scale eddies may enhance diffusion in air of gaseous fuels having small molecular mass. The turbulence inducer may comprise a plurality of baffles for converting the laminar kinetic energy of the incoming intake flow into turbulent kinetic energy characterized by medium scale eddies. The plurality of baffles may be alternatively angled. The plurality of baffles may be alternatively angled at an angle in the range of approximately ±15°-45°.

In certain embodiments with $H_2$ fuel, highly homogenous mixtures are necessary to mitigate the propensity for knock and lubrication oil preignition (LOP) at engine power density conditions higher than approximately 12 bar Brake Mean Effective Pressure (BMEP). The intake turbulence inducing device may be designed by means of validated Computational Fluid Dynamics (CFD) simulations to achieve the desired homogeneity while minimizing the pressure losses in the intake port.

In certain embodiments, controlled in-cylinder air-fuel mixture Lambda (λ) homogeneity means having either a homogeneous mixture throughout the combustion chamber volume or having a predeterminate λ distribution, for example, center-rich to increase the amount of fuel admitted to the passive prechamber during the compression stroke. Homogeneous λ distributions may be defined by the uniformity index ($UI=\lambda-\lambda_{standard\ deviation}/\lambda_{mean}$)

$$UI = 1 - \frac{\lambda_{st\ dev}}{\lambda_{mean}}.$$

In order to prevent fuel rich pockets from causing abnormal combustion events like knock and preignition, values for the UI may be used with $H_2$ mixtures of λ in the range of approximately 2.8-3.4 may be greater than 0.94. In certain embodiments, in the case of center-rich λ distribution, the level of λ stratification may be defined in terms of the difference between the mean λ in the center of the cylinder and the mean λ at the periphery of the cylinder. In certain embodiments, in order to prevent excessive stratification from causing abnormal combustion events like knock and misfire, typical values for the level of λ stratification used with $H_2$ mixtures of λ in the range of approximately 2.8-3.4 may be smaller than 0.4 2.

In certain embodiments, FIG. 1 shows combustion chamber 100 with passive prechamber 110 with a homogeneous mixture throughout combustion chamber 100 having a UI of approximately 0.98. In this embodiment, the passive prechamber 110 may be filled with moderately rich Lambda having a value similar to that of the combustion chamber 100. This condition may prevent the occurrence of abnormal combustion events like knock and preignition and may enable stable engine operations at higher engine power densities than 16 bar and efficiency greater than 42%.

Figure 2:
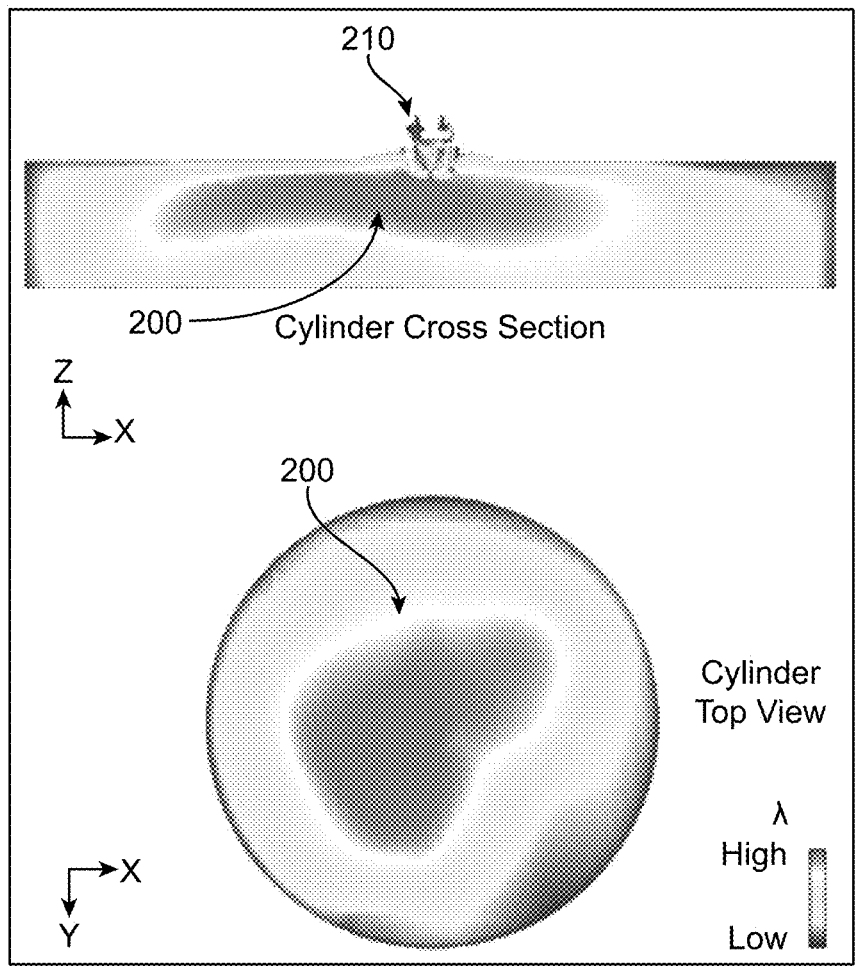
FIG. 2 depicts a cross-section view (top) and top view (bottom) of an in-cylinder center-rich Lambda (2) distribution in accordance with certain embodiments.

In certain embodiments, FIG. 2 shows combustion chamber 200 with precombustion chamber 210 with a center-rich Lambda distribution used with a passive prechamber engine having high propensity to LOP. In certain embodiments, the center-rich Lambda distribution may have a level of λ stratification smaller than 0.4λ. In certain embodiments, this may allow more fuel to be admitted to the prechamber during the compression stroke which results in more powerful flame jets to be ensued from the prechamber and, ultimately, more efficient combustion. In certain embodiments, the center rich Lambda distribution may allow for leaner Lambda regions to be formed at the periphery of the cylinder where the lubrication oil concentration and, hence, the propensity to LOP is the highest. Having leaner regions at the periphery of the cylinder may reduce the occurrence of LOP.

In certain embodiments, the challenges concerning homogeneous mixture preparation may be quite different depending on whether the fuel is in a gaseous state or in a liquid state. In the case of gaseous fuels there is no wall wetting as with liquid fuels. In certain embodiments, in the case of $H_2$ the small molecular mass may present a significant barrier for the diffusion in air. In certain embodiments, $CH_3OH$ may have the tendency to clump together due to the high molecular adhesion making the process of breakup and vaporization more difficult compared to, for example, gasoline. With poor breakup and vaporization, the fuel may tend to condense as liquid film on surfaces creating what is generally called a wall-film. As a result, when the fuel is injected in the intake, well upstream of the port as it is typically done in industrial or heavy duty internal combustion engine, a substantial amount of fuel, in certain embodiments 50% or more, may remain in the port as a wall-film instead of going into the cylinder and participating in the combustion process. Similarly, when the fuel is directly injected into the cylinder, a considerable amount, in some embodiments in the range of 30%, may condense as wall-film thereby losing the opportunity to properly mix with air and generate power via the combustion process. Therefore, in certain embodiments with liquid fuels, the breakup, vaporization and mixing with air to form homogeneous mixtures may be essential to the efficient production of power.

In certain embodiments, the higher the injection differential pressure under which the liquid fuel is injected, the higher the sheer forces acting upon the fuel stream that cause the stream to breakup into small droplets. In certain embodiments in the case of port fuel injection, the injection differential pressure may be defined as the pressure at which the fuel is injected minus the pressure in the port. In certain embodiments in the case of in-cylinder direct injection, the injection differential pressure may be defined as the pressure at which the fuel is injected minus the pressure in-cylinder. As each droplet travels through the air, it may vaporize at a rate proportional to the relative speed between the droplets and the air. As the fuel vaporizes, it may mix with the air forming an ignitable air-fuel mixture.

Figure 3:
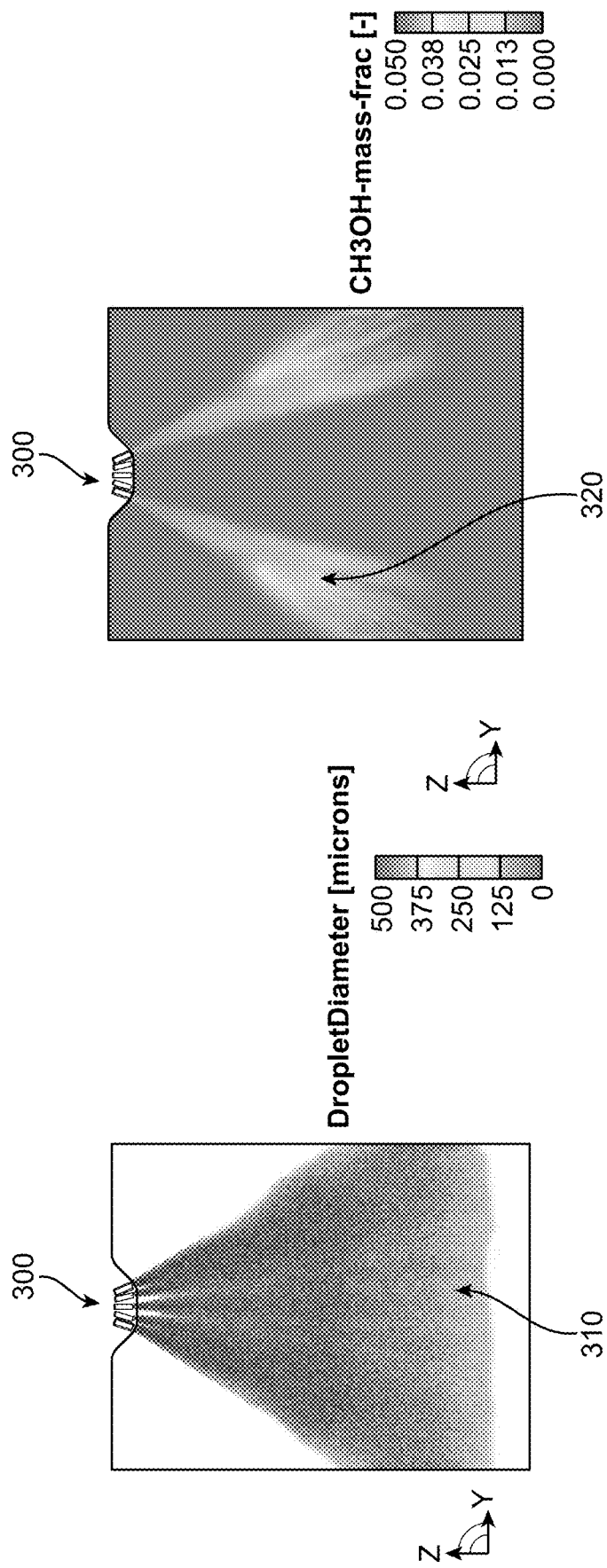
FIG. 3 depicts a $CH_3OH$ spray simulation showing droplet diameter (left) and vapor distribution (right) in accordance with certain embodiments.

In certain embodiments, FIG. 3 shows a CFD spray simulation from injector 300 in quiescent air depicting the $CH_3OH$ droplet diameter distribution 310 and the vapor distribution 320. In certain embodiments, when the injection takes place in quiescent air, the methanol fuel droplets evaporated may be nearly zero. This means that to achieve droplets vaporization, a certain air flow may necessary.

In certain embodiments, once the liquid fuel stream has been broken up into small droplets due to the sheer forces created by the velocity difference between the injected liquid stream and the surrounding air, a subsequent high intensity air vorticity or small scale turbulence may be necessary to realize the level of convection acting on the droplets that may achieve vaporization and form the gas phase.

In certain embodiments, with hard to mix gaseous fuels like $H_2$ having small molecular mass and, hence, low diffusivity in air, low intensity vorticity or large-scale turbulence may be necessary to improve the diffusivity of the $H_2$ molecules throughout the air and may realize a uniform mixing.

Certain embodiments provide the methods and apparatuses by which the liquid fuel stream created by the injector may be broken up into small droplets, and subsequently vaporized to form homogeneous air-fuel mixtures in the intake port or in the cylinder of internal combustion engines fueled with Methanol, Ethanol, Gasoline, and other liquid fuels.

Certain embodiments may provide the methods and apparatuses by which hard to mix gaseous fuels may be effectively diffused into air to achieve uniform mixing in the intake port or in the cylinder of an internal combustion engine fueled with $H_2$, $CH_4$, $NH_3$, and other gaseous fuels.

Certain embodiments may provide effective methods and apparatuses for achieving high degree of air-fuel mixture homogeneity throughout the cylinder of an internal combustion engine to prevent the occurrence of combustion anomalies like knock and preignition, thereby allowing the engine to operate at high levels of power densities, defined as Brake Mean Effective Pressure (BMEP) and engine efficiencies, defined as Brake Thermal Efficiency (BTE), with alternative fuel like $H_2$, $CH_3OH$, $CH_4$, $NH_3$ to reach net zero emissions.

Figure 4:
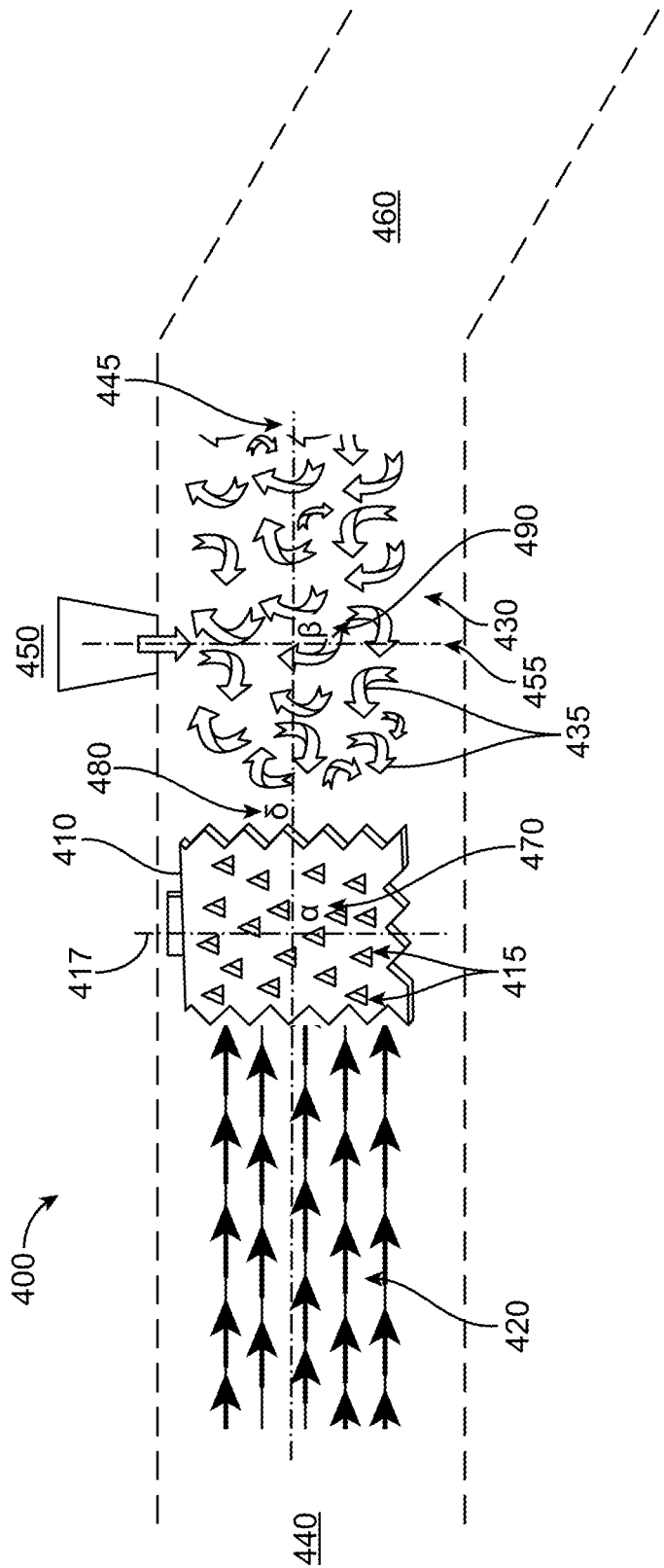
FIG. 4 depicts an Edge type of Turbulence Inducer in accordance with certain embodiments.

In certain embodiments, FIG. 4 depicts an Edge type of Turbulence Inducer (TI) 400. TI 400 may use perforated plate 410 located in engine intake runner 440 and upstream of fuel injector 450. Perforated plate 410 may have multiple sharp edges 415 which may convert the laminar kinetic energy (LKE) of the incoming intake flow 420 upstream of perforated plate 410 into turbulent kinetic energy (TKE) 430 before entering engine intake port 460. In certain embodiments, the perforated plate 410 may be located at a predeterminate distance ($\delta$) 480 upstream of the intake port 460 along a first longitudinal axis 445 of the engine intake runner 440. In certain embodiments, the perforated plate 410 may be oriented so that its longitudinal axis 417 forms an angle ($\alpha$) 470 with the longitudinal axis 445 of the engine intake runner 440. In certain embodiments, the fuel injector 450 may be oriented so that its longitudinal axis 455 forms an angle ($\beta$) 490 with the longitudinal axis 445 of the engine intake runner 440. In certain embodiments, a sharp edge 415 may be defined as having a curvature radius smaller than 0.1 mm. The number of edges (NE) may be proportional to the area (A) of the perforated plate 410 and may be defined by the following formula: $NE=A/30$ mm$^2$. In certain embodiments, this type of TI may produce eddies 435 having a length scale (LSE) in the range of approximately 0.5-2.0 mm and a TKE in the range of approximately 20-200 m$^2$/s$^2$. The LSE and the TKE generated by this type of TI may depend on the intake flow velocity (V) as defined by the following approximate formulas: $LSE=0.08/V$; $TKE=1.25V$.

Figure 5:
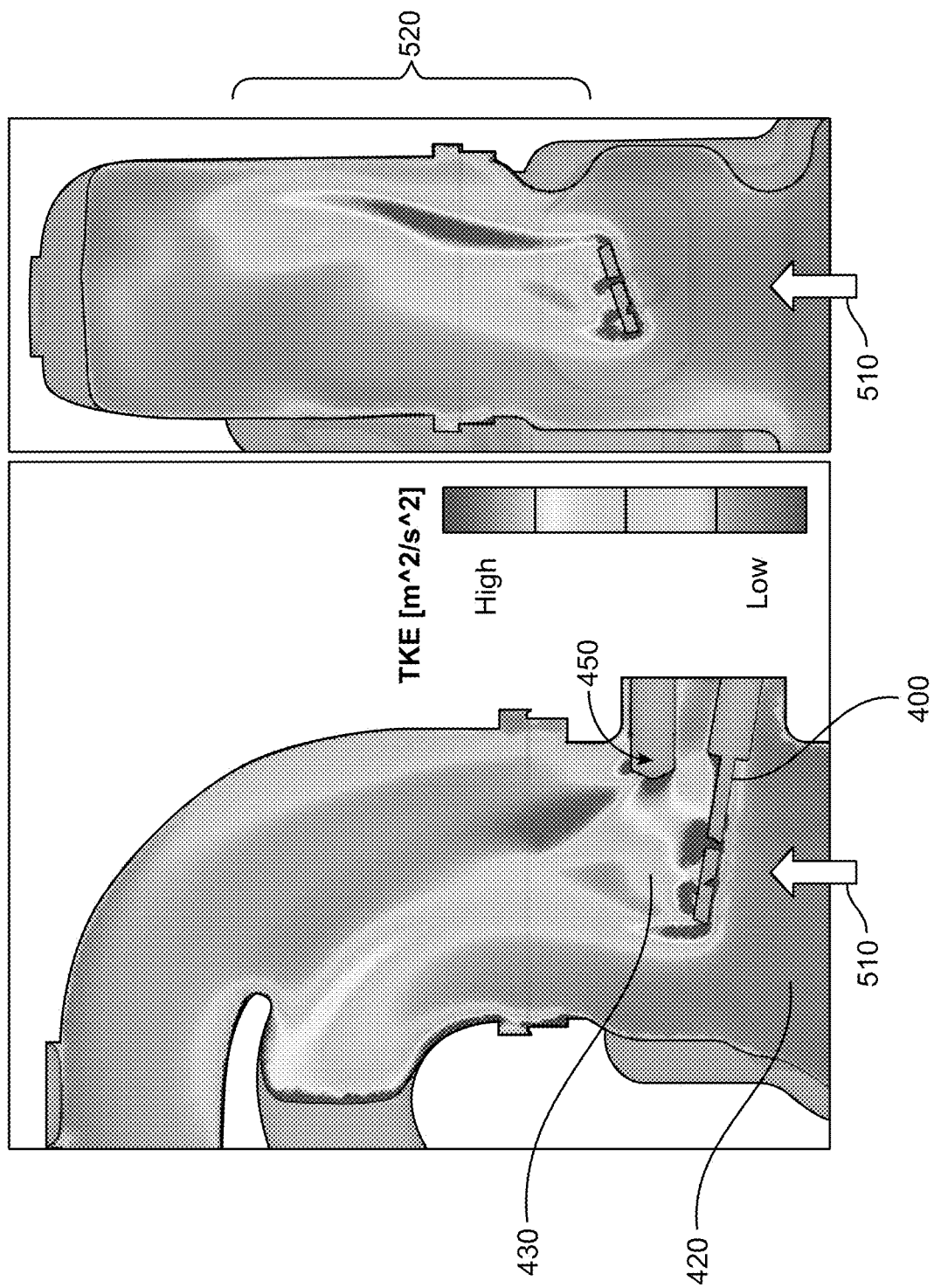
FIG. 5 depicts a CFD simulation of an Edge type Turbulence Inducer creating high turbulent kinetic energy (TKE) in the fuel injector region in accordance with certain embodiments.

In certain embodiments, FIG. 5 shows a CFD simulation of the "Edge" type TI 400 with intake air flow direction 510 which may create high TKE in the fuel injector region 450 with turbulence propagating distance 520. It can be seen that the turbulence 430 generated by the edges located at the periphery of the perforated plate 410 propagates for a much longer distance 520 downstream compared to the turbulence generated by the edges located in the middle of the perforated plate 410.

Figure 6:
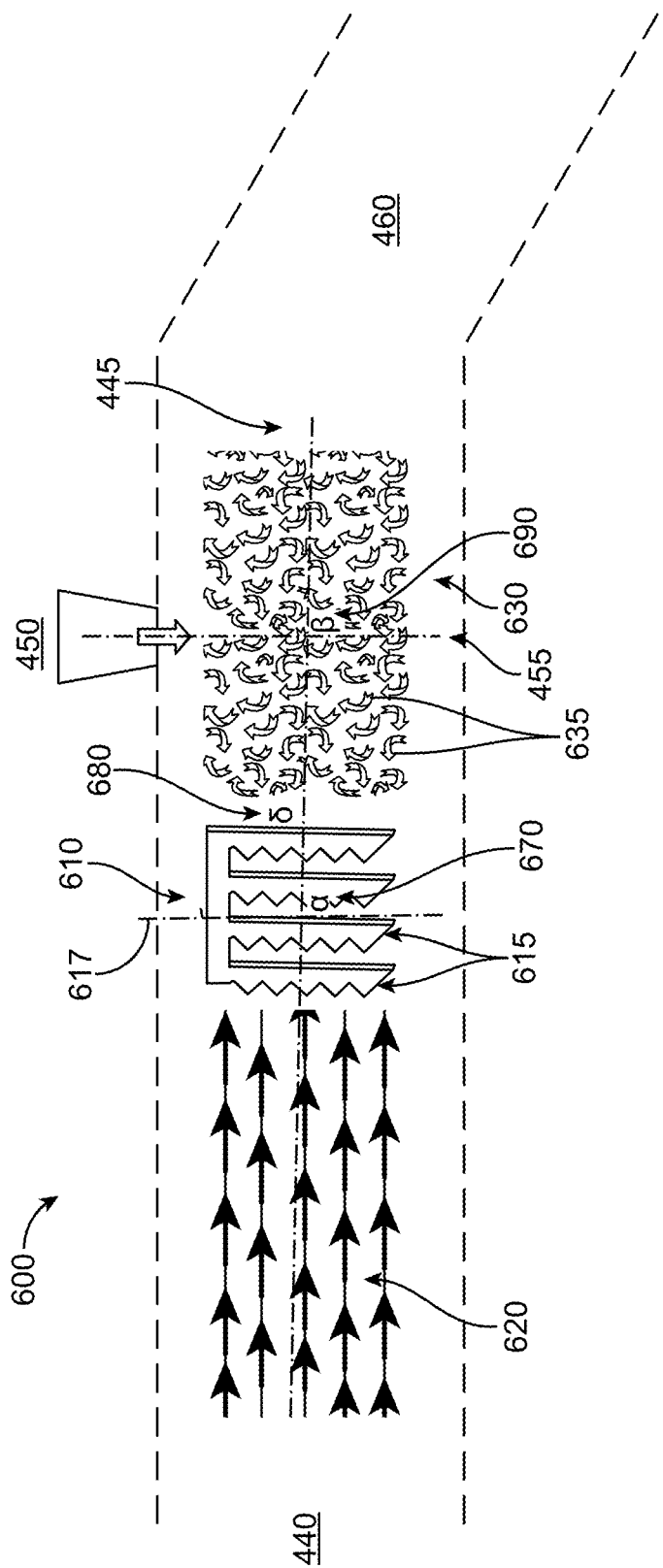
FIG. 6 depicts a Fork type Turbulence Inducer in accordance with certain embodiments.

Another embodiment of "Edge" type of TI 600, the "Fork" type, is provided in FIG. 6. Here, instead of a perforated plate 410, a fork shaped turbulence inducer 610 with rows of jagged edged blades 615 are used to propagate the region of high turbulence 630 for a longer distance of about 2-4 times further downstream from the location of the TI. Also, the LSE of the eddies 635 with the "Fork" TI 610 tend to be in the lower range of 0.5-2.0 mm and the TKE 630 tends to be in the upper range of 20-200 m$^2$/s$^2$, whereas with the "Edge" TI 410 the LSE tends to be in the upper range of 0.5-2.0 mm and the TKE 630 tends to be in the lower range of 20-200 m²/s². In certain embodiments, the fork shaped turbulence inducer 610 may be located a predeterminate distance (δ) 680 upstream of the intake port along a first longitudinal axis 445 of the engine intake runner 440. In certain embodiments, fork shaped turbulence inducer 610 may be oriented so that its longitudinal axis 617 forms an angle (α) 670 with the longitudinal axis 445 of the engine intake runner 440. In certain embodiments, the fuel injector 450 may be oriented so that its longitudinal axis 455 forms an angle (β) 690 with the longitudinal axis 445 of the engine intake runner 440.

Figure 7:
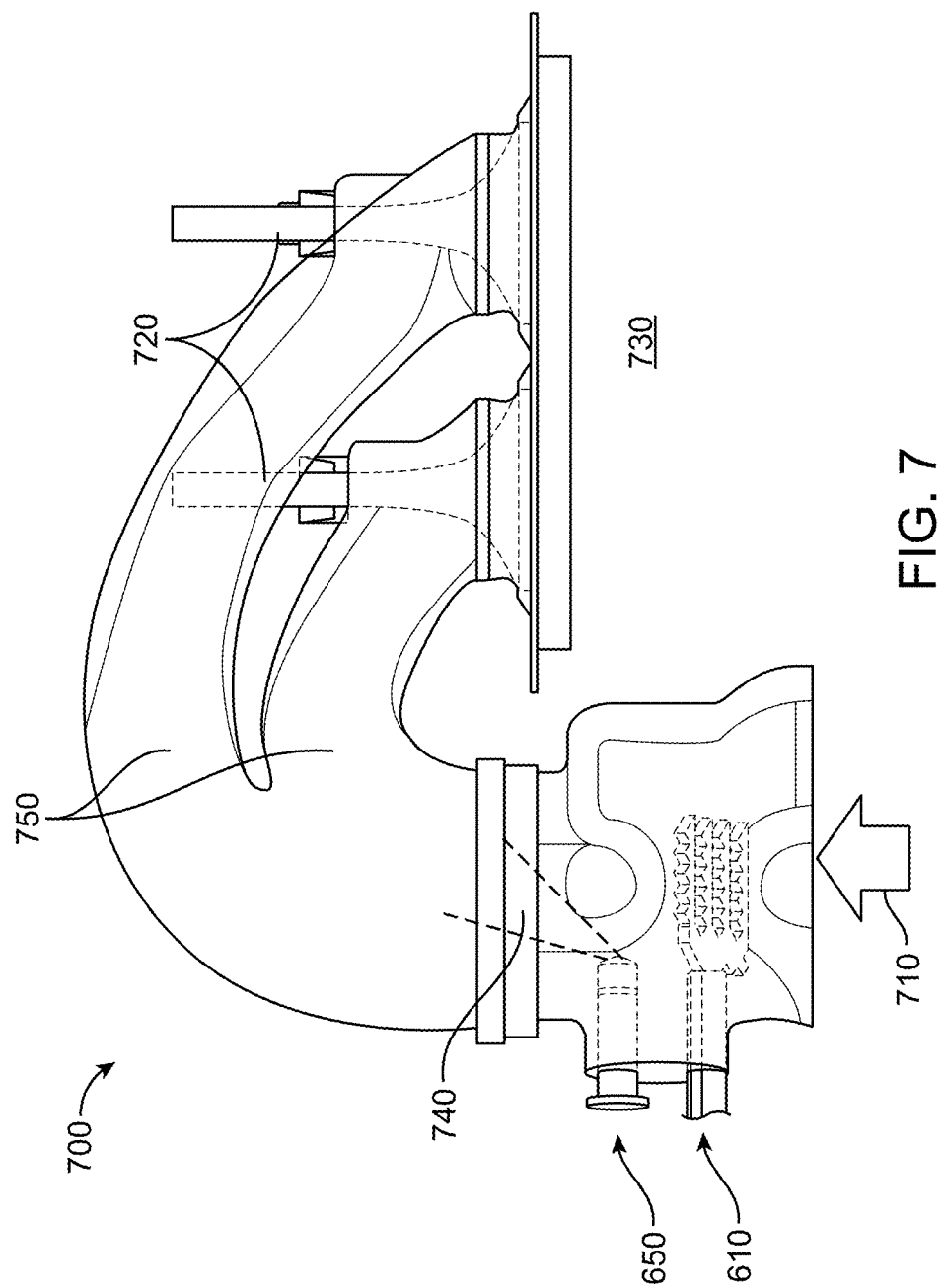
FIG. 7 depicts a Fork Turbulence Inducer installation in internal combustion engine intake ports in accordance with certain embodiments.

In certain embodiments, FIG. 7 shows an intake port engine 700 that may include a Fork type TI 610 (as shown) or an Edge type TI 410. In certain embodiments, the location of the TI 610 proximate the location of the injector 650 with fuel plume 740 and that both are relatively remote from intake valves 720 and engine cylinder 730. This means that in order to achieve thorough mixing the turbulence created by the TI 610 or 410 must propagate for a relatively long distance via Intake ports 750 to also influence the mixing in the region where the intake valves are located.

Figure 8:
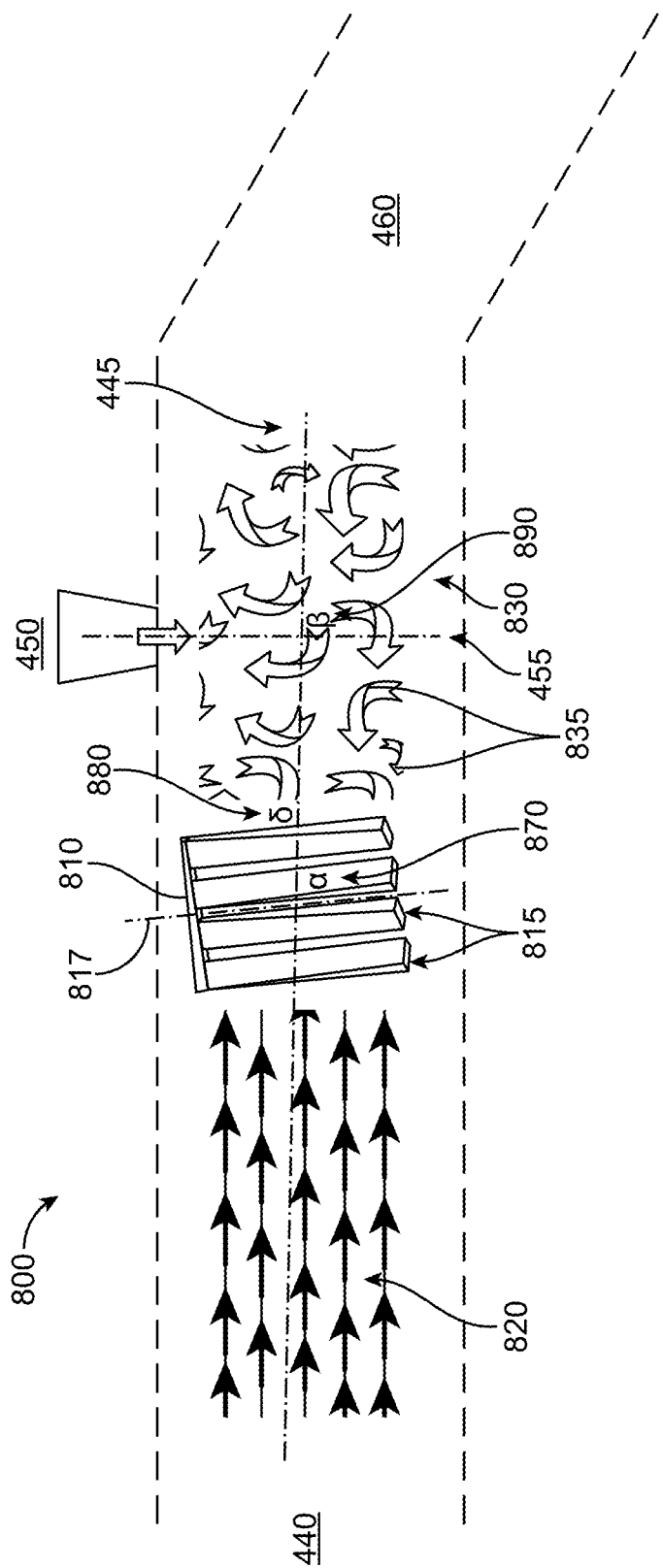
FIG. 8 depicts a Baffle type of Turbulence Inducer in accordance with certain embodiments.

In certain embodiments, FIG. 8 depicts a "Baffle" type 810 of Turbulence Inducer 800. This type of TI may use rows of baffles 815, alternatively pitched at an angle in the range of approximately ±15°-45°, to convert the laminar kinetic energy of the incoming intake flow 820 into turbulent kinetic energy 830 characterized by medium scale eddies 835. In certain embodiments, Baffle TI 810 may include a row of baffles 815 having sharp edges with a curvature radius in the range of 0.1-0.2 mm. This type of TI may produce medium size eddies 835 having a length scale (LSE) in the range of approximately LSE-0.1-3.0 mm and a TKE in the range of approximately 20-150 m²/s². The LSE and the TKE generated by Baffle TI 810 may depend on the intake flow velocity (V) as defined by the following approximate formulas: LSE=0.15/V; TKE=0.9V. In certain embodiments, Baffle TI 810 may be located a predeterminate distance (δ) 880 upstream of the intake port along a first longitudinal axis 445 of the engine intake runner 440. In certain embodiments, Baffle TI 810 may be oriented so that its longitudinal axis 817 forms an angle (α) 870 with the longitudinal axis 445 of the engine intake runner 440. In certain embodiments, the fuel injector 450 may be oriented so that its longitudinal axis 455 forms an angle (β) 890 with the longitudinal axis 445 of the engine intake runner 440.

Figure 9:
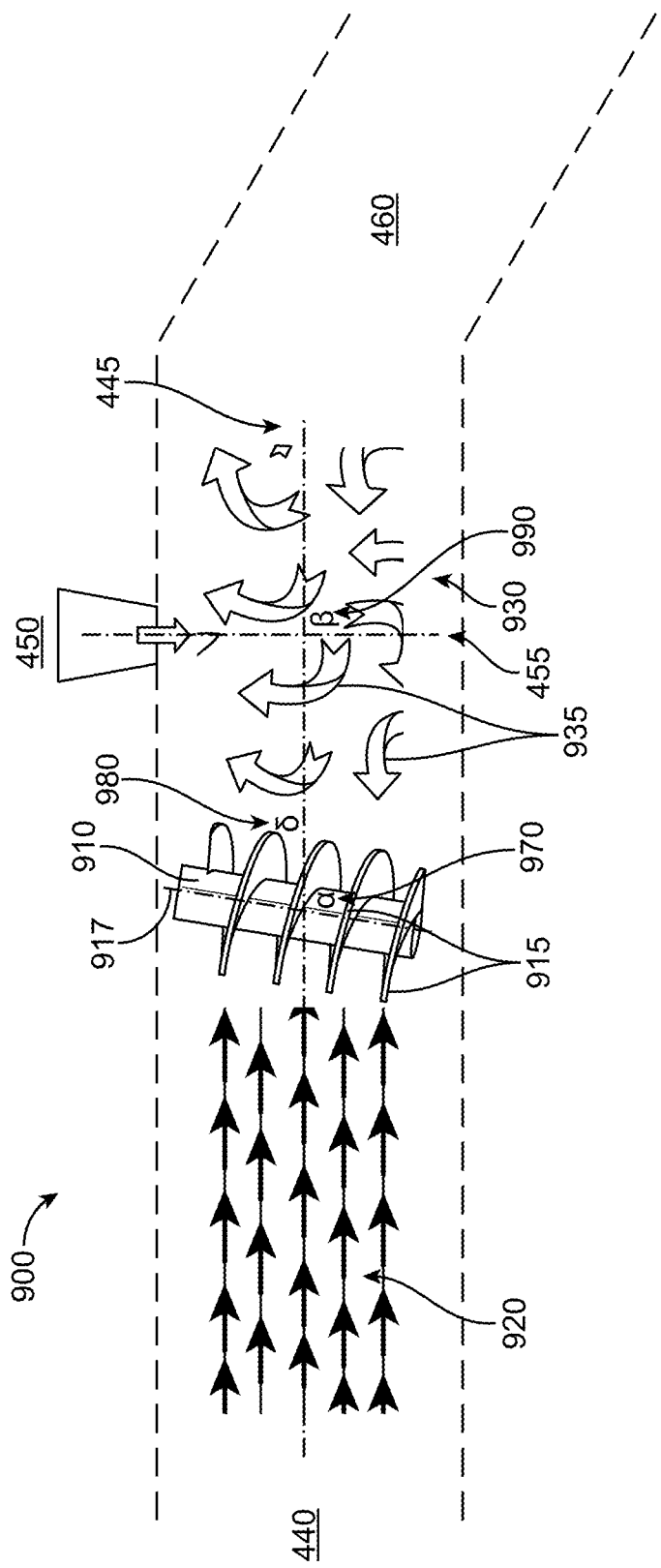
FIG. 9 depicts a Helical type of Turbulence Inducer in accordance with certain embodiments.

In certain embodiments, FIG. 9 depicts a "Helical" type 910 of Turbulence Inducer 900. This concept uses helical surfaces 915 to convert the laminar kinetic energy of the incoming intake flow 920 into turbulent kinetic energy 930 characterized by large scale eddies 935. In certain embodiments, Helical TI 910 may be located a predeterminate distance (δ) 980 upstream of the intake port along a first longitudinal axis 445 of the engine intake runner 440. In certain embodiments, Helical TI 910 may be oriented so that its longitudinal axis 917 forms an angle (α) 970 with the longitudinal axis 445 of the engine intake runner 440. In certain embodiments, the fuel injector 450 may be oriented so that its longitudinal axis 455 forms an angle (β) 990 with the longitudinal axis 445 of the engine intake runner 440.

Large scale eddies 935 may have a length scale (LSE) in the range of approximately LSE-0.15-3.0 mm and a TKE in the range of approximately 20-100 m²/s². The LSE and the TKE generated by this Baffle TI 910 may depend on the intake flow velocity (V) as defined by the following approximate formulas: LSE=0.2/V; TKE=0.65V.

In certain embodiments, the size of the eddies and the level of TKE created by the TI may be related to the energy losses resulting from converting the laminar flow into a turbulent flow. In certain embodiments, the energy losses associated with the "Edge" type 410 and "Fork" type 610 of TI may be 5-20% larger compared to those associated with the "Baffle" type 810 of TI and to the "Helical" type 910 of TI. In certain embodiments, by using the proper type of TI device for the application and maintaining the pressure loses in the intake runner due to the TI below 0.1 bar, it may be possible to maximize the efficiency of conversion and to minimize the energy losses. In certain embodiments, criteria may be used based on the physical state of the fuel as being liquid or gaseous and to the molecular mass of the fuel molecule. In certain embodiments in the case of liquid fuels like Methanol, smaller scale eddies and high turbulence may enhance breakup and vaporization. In certain embodiments, "Edge" type TI 410 or "Fork" type TI 610 may be used for these applications requiring small scale eddies. In certain embodiments for gaseous fuels having small molecular mass like Hydrogen, larger scale eddies 835 may enhance diffusion in air and promote enhanced mixing in the intake port prior to the admission into the cylinder. In certain embodiments, "Helical" type TI 910 may be used for these applications requiring large scale eddies. In certain embodiments, "Baffle" type TI 810 may be used for applications requiring medium scale eddies.

In certain embodiments, the values of the alfa angle (α) (470, 670, 870, 970), the beta angle (β) (490, 690, 890, 990), and the delta distance (δ) (480, 680, 880, 980), shown in FIGS. 4, 6, 8 and 9 may define the proximity and alignment of the TI with respect to the injector 450 and to the intake runner 440, and may be analyzed using a validated CFD simulation tool to determine the specific proximity and alignment of the TI with respect to fuel injector 450 and intake runner 440 that results in sufficient breakup, vaporization and mixing with the intake air, in the case of liquid fuels like Methanol, or in sufficient diffusivity and mixing with the intake air, in the case of gaseous fuels like Hydrogen.

In certain embodiments, the alfa angle (α) (470, 670, 870, 970), the beta angle (β) (490, 690, 890, 990), and the delta distance (δ) (480, 680, 880, 980) may be a function of one or more of air velocity, fuel velocity, fuel type, engine intake runner and port geometry, and may be calculated by means of CFD analysis. For medium and high speed industrial and marine engines fueled by one or more of Hydrogen and Methanol, predeterminate angle α may be in the approximate range of 90° to 60°, predeterminate angle β may be in the approximate range of 90° to 60°, and predeterminate distance delta (δ) may be in the approximate range of 20 mm to 50 mm. For heavy-duty on-off highway engines, predeterminate angle α may be in the approximate range of 90° to 40°, predeterminate angle β may be in the approximate range of 90° to 40°, and predeterminate distance delta (δ) may be in the approximate range of 10 mm to 30 mm. In certain embodiments, the alfa angle (α) (470, 670, 870, 970), the beta angle (β) (490, 690, 890, 990), and the delta distance (δ) (480, 680, 880, 980) may be linked in a functional relationship defined by a validated CFD simulation tool to create the specific turbulence characteristics in terms of scale and intensity of eddies to optimize the mixing between the fuel and the intake air for each specific engine application.

In certain embodiments, the complex interactions occurring between the intake flow regime, described by the Reynolds number, its velocity, its pressure and temperature, the TI design, the injector design, the way the TI and the injector are disposed with respect to each other and with respect to the intake runner, and the geometry of the intake runner, may be analyzed by means of a numerical tool based on physical models that has been empirically validated and is representative of the engine type and application.

Figure 10:
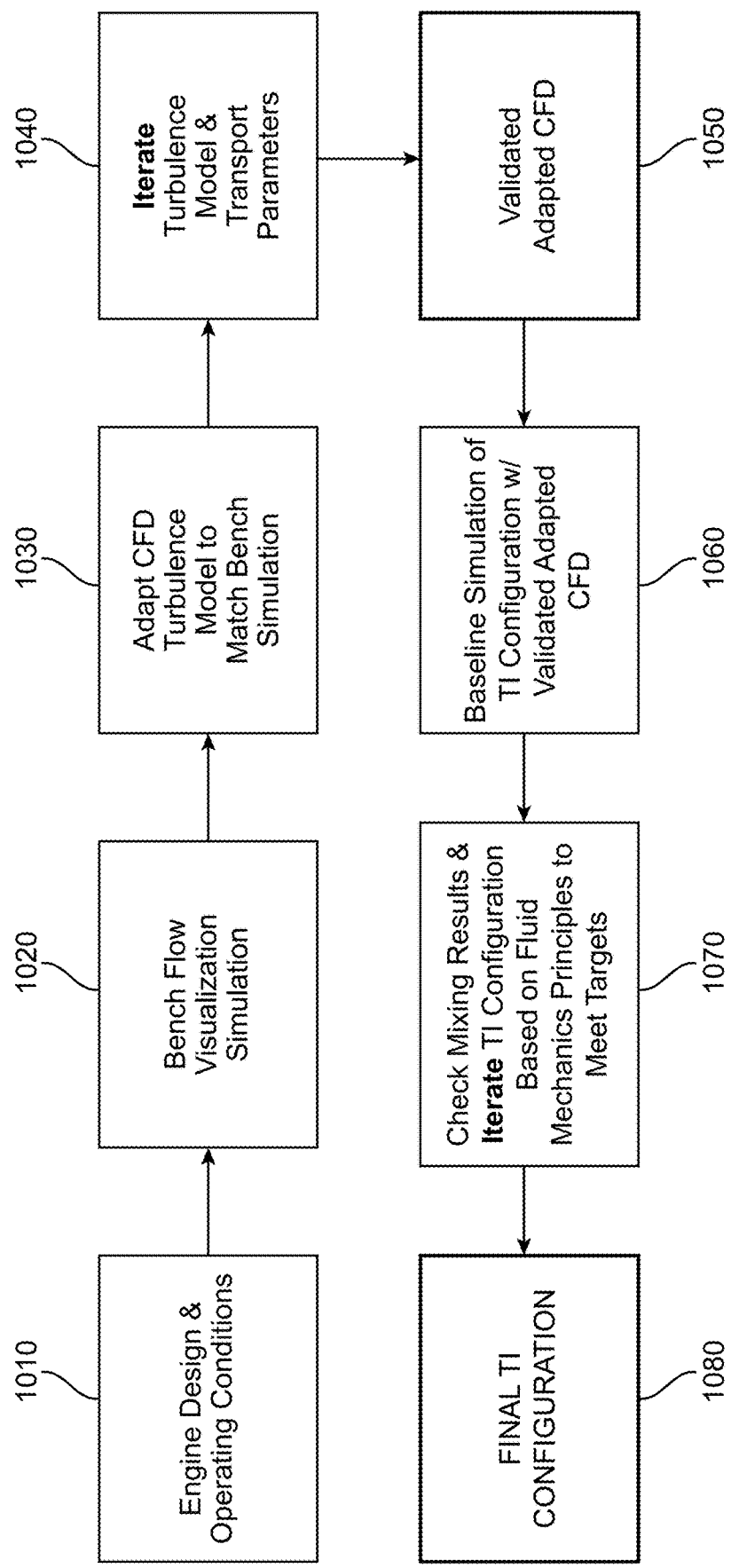
FIG. 10 depicts a flow chart of the criteria and methodology to validate a CFD tool used to define the proximity and alignment (configuration) of the Turbulence Inducer with respect to the injector and to the intake runner.

In certain embodiments, FIG. 10 is a flow chart 1000 of the process of validating a CFD tool that may be used to define the proximity and alignment of a TI with respect to fuel injector 450 and intake runner 440 with respect to the fuel injector 450 and engine intake runner 440 geometry, fuel type and engine operating conditions is provided based on the use of a CFD simulation tool. In certain embodiments, chart 1000 shows the iterative nature of this process.

In certain embodiments, the CFD model and transport parameters may be iterated to match the bench flow visualization data simulating the engine operating conditions to obtain an adapted CFD model that is representative of the intake flow at the engine operating conditions and is defined as the validated adapted CFD. Then, iterations on the TI configuration may be conducted based on fluid mechanic principles to achieve specific mixing targets and to define the final TI configuration. These criteria and methodology may be used to create the specific turbulence level and length scale of the eddies which are necessary to optimize the mixing between the fuel and the intake air for each specific engine type and application.

In certain embodiments as shown in Step 1010 Engine Design and Operating Conditions may be input. In certain embodiments, a CFD turbulence model such as RNG Zeta-F or Reynolds Stress Model or Detached Eddy Simulation (DES) or Large Eddy Simulation (LES) may be adapted and the transport parameters for mass and heat such as Prandtl and Schmidt numbers to the specific engine characteristics such as a) cylinder bore & stroke, b) engine rpm, c) intake runner geometry, d) Lambda, e) fuel type, f) fuel injector geometry, and TI geometry, may be adapted to match the empirical data from bench flow visualization testing simulating engine operation for each application segment such as industrial, marine and heavy duty on-off highway.

Certain embodiments as shown in Step 1020 may conduct a Bench Flow Visualization Simulation to make a first simulation of the current engine configuration to establish a baseline. In certain embodiments, the target improvements in terms of mixture homogeneity and required turbulence levels may be based on results of the first simulation 1020. Define the strategy to achieve the improvements in terms of type and geometry of the TI, the injector geometry, the injection pressure and duration, the relative location and orientation of the TI and injector. Certain embodiments as shown in Step 1030 may adapt the CFD Turbulence Model to match the bench simulation and may use the adapted CFD turbulence model to simulate the intake and compression processes in terms of flow and Lambda distribution.

Certain embodiments as shown in Step 1040 may iterate the turbulence model and transport parameters to arrive at Validated Adapted CFD model 1050. Certain embodiments may conduct iterative simulations of the configuration resulting from the initial strategy and may analyze the results in terms of mixture homogeneity and turbulence levels. Based on results further improve the system in terms of TI design and location and injector design and location as needed based on fundamental fluid mechanics principles.

In certain embodiments as shown in Step 1060, a baseline simulation of TI Configuration may be conducted using the Validated Adapted CFD model. In certain embodiments as shown in Step 1070, the mixing results may be checked and the TI configuration may be iterated based on fluid mechanics principles to meet targets to arrive at a final TI configuration at Step 1080.

In certain embodiments, CFD simulations and engine test results of the Turbulence Inducer with engines fueled by one or more of Hydrogen and Methanol indicate remarkable extension of the knock and LOP limits enabling combustion improvements resulting in a power output increase of approximately 5-20%.

In certain embodiments, devices such as Turbulence Inducers may be installed within the intake runner in the proximity of the intake ports of an internal combustion engine. Such Turbulence Inducer devices may be designed in a way to efficiently convert the laminar flow kinetic energy into turbulent flow kinetic energy and consequently increase the mixing of fuels like Hydrogen, Methanol, and other liquid or gaseous fuels known by the skilled person, that are injected in the intake port or in-cylinder during the intake stroke of an internal combustion engine.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended 5 hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not a limitation of the invention.

We claim:

1. An internal combustion engine, comprising:
an engine intake port;
an engine intake runner upstream of the engine intake port;
at least one fuel injector upstream of the engine intake port;
a turbulence inducer upstream of the fuel injector to convert laminar flow upstream of the turbulence inducer to turbulent flow downstream of the turbulence inducer;
wherein the turbulent flow is characterized by small scale eddies with a length scale (LSE) in the range of approximately LSE=0.5-2.0 mm and a turbulent kinetic energy (TKE) in the range of approximately 20-200 $m^2/s^2$, and wherein LSE and TKE depend on the intake flow velocity (V) as defined by the following approximate formulas: LSE=0.08/V; TKE=1.25V that; and
wherein the fuel stream comprises one or more of Hydrogen and Methanol.

2. The internal combustion engine of claim 1, wherein the turbulence inducer is located a predeterminate distance ($\delta$) upstream of the intake port along a first longitudinal axis of the engine intake runner.

3. The internal combustion engine of claim 2, wherein the predeterminate distance ($\delta$) is between 20 mm and 50 mm.

4. The internal combustion engine of claim 2, wherein the predeterminate distance ($\delta$) is between 10 mm and 30 mm.

5. The internal combustion engine of claim 2, wherein the predeterminate distance ($\delta$) is a function of one or more of air velocity, fuel velocity, fuel type, engine intake runner geometry, and port geometry.

6. The internal combustion engine of claim 1, wherein the turbulence inducer is configured to convert the kinetic energy of the intake flow upstream of the turbulence inducer into turbulent flow to enhance the mixing of a fuel stream injected into the intake port via the fuel injector.

7. The internal combustion engine of claim 1, wherein the turbulence inducer is configured to convert the kinetic energy of the intake flow upstream of the turbulence inducer into turbulent flow to enhance the mixing of a fuel stream injected into a combustion cylinder during the intake stroke of an internal combustion engine.

8. The internal combustion engine of claim 2, wherein the turbulence inducer comprises a second longitudinal axis that forms a predeterminate angle alfa ($\alpha$) with the first longitudinal axis of the engine intake runner.

9. The internal combustion engine of claim 8, wherein the predeterminate angle alfa ($\alpha$) is between 90° and 60°.

10. The internal combustion engine of claim 8, wherein predeterminate angle alfa ($\alpha$) is between 90° and 40°.

11. The internal combustion engine of claim 8, wherein predeterminate angle alfa ($\alpha$) is a function of one or more of air velocity, fuel velocity, fuel type, engine intake runner geometry and port geometry.

12. The internal combustion engine of claim 8, wherein the fuel injector comprises a third longitudinal axis that forms a predeterminate angle beta ($\beta$) with the first longitudinal axis of the engine intake runner.

13. The internal combustion engine of claim 12, wherein the predeterminate angle beta ($\beta$) is between 90° and 60°.

14. The internal combustion engine of claim 12, wherein predeterminate angle beta ($\beta$) is between 90° and 40°.

15. The internal combustion engine of claim 12, wherein predeterminate angle beta ($\beta$) is a function of one or more of air velocity, fuel velocity, fuel type, engine intake runner geometry and port geometry.

16. The internal combustion engine of claim 12, the angle alfa ($\alpha$), the angle beta ($\beta$) and the distance delta ($\delta$) are linked in a functional relationship to create turbulence characteristics necessary to optimize the mixing between fuel and combustion air for a specific engine application.

17. The internal combustion engine of claim 1, wherein a size of the eddies in the turbulent flow is related to the physical state of the fuel as being liquid or gaseous and to the fuel molecular mass.

18. The internal combustion engine of claim 1, wherein the turbulence inducer comprises a perforated plate comprising a plurality of sharp edges for converting the laminar kinetic energy of the laminar flow into turbulent kinetic energy characterized by small scale eddies.

19. The internal combustion engine of claim 18, wherein the small scale eddies enhance breakup and vaporization of liquid fuels.

20. An internal combustion engine, comprising:
an engine intake port;
an engine intake runner upstream of the engine intake port;
at least one fuel injector upstream of the engine intake port;
a turbulence inducer upstream of the fuel injector to convert laminar flow upstream of the turbulence inducer to turbulent flow downstream of the turbulence inducer;
wherein the turbulence inducer comprises one or more helical surfaces for converting the laminar kinetic energy of the laminar flow into turbulent kinetic energy characterized by large scale eddies;
wherein the large scale eddies have a length scale (LSE) in the range of approximately LSE=0.15-3.0 mm and a turbulent kinetic energy (TKE) in the range of approximately 20-100 $m^2/s^2$;
wherein the large scale eddies have the LSE and the TKE that depend on the intake flow velocity (V) as defined by the following approximate formulas: LSE=0.2/V; TKE=0.65V; and
wherein the fuel stream comprises one or more of Hydrogen and Methanol.

21. The internal combustion engine of claim 20, wherein the larger scale eddies enhance diffusion in air of gaseous fuels having small molecular mass.

22. The internal combustion engine of claim 21, wherein a size of the eddies in the turbulent flow is related to the physical state of the fuel as being liquid or gaseous and to the fuel molecular mass.

23. An internal combustion engine, comprising:
an engine intake port;
an engine intake runner upstream of the engine intake port;
at least one fuel injector upstream of the engine intake port;
a turbulence inducer upstream of the fuel injector to convert laminar flow upstream of the turbulence inducer to turbulent flow downstream of the turbulence inducer;
wherein the turbulence inducer comprises a plurality of baffles for converting the laminar kinetic energy of the incoming intake flow into turbulent kinetic energy characterized by medium scale eddies;
wherein the plurality of baffles are alternatively angled at an angle in the range of approximately ±15°-45°; and
wherein the fuel stream comprises one or more of Hydrogen and Methanol.

24. The internal combustion engine of claim 23, wherein the medium scale eddies have a length scale (LSE) in the range of approximately LSE=0.1-3.0 mm and a TKE in the range of approximately 20-150 $m^2/s^2$.

25. The internal combustion engine of claim 23, wherein the medium scale eddies have an LSE and a TKE that depend on the intake flow velocity (V) as defined by the following approximate formulas: LSE=0.15/V; TKE=0.9V.

26. The internal combustion engine of claim 23, wherein a size of the eddies in the turbulent flow is related to the physical state of the fuel as being liquid or gaseous and to the fuel molecular mass.

* * * * *